United States Patent [19]

Duval

[11] Patent Number: 4,981,289

[45] Date of Patent: Jan. 1, 1991

[54] CLAMP FOR MILLING MACHINES OR THE LIKE

[76] Inventor: John E. Duval, 117 Kimball Rd., Amesbury, Mass. 01913

[21] Appl. No.: 453,410

[22] Filed: Dec. 19, 1989

[51] Int. Cl.[5] .............................................. B23Q 3/02
[52] U.S. Cl. .............................................. 269/94
[58] Field of Search ............................. 269/91–95, 269/239, 246, 285, 268

[56] References Cited

U.S. PATENT DOCUMENTS

| | | | |
|---|---|---|---|
| 1,346,504 | 7/1920 | Mathison | 269/94 |
| 1,995,206 | 3/1935 | Geissbuhler | 269/94 |
| 4,002,328 | 1/1977 | Wolf et al. | 269/246 |

FOREIGN PATENT DOCUMENTS

| | | | |
|---|---|---|---|
| 107926 | 7/1917 | United Kingdom | 269/93 |

*Primary Examiner*—Robert C. Watson
*Attorney, Agent, or Firm*—Pearson & Pearson

[57] ABSTRACT

The clamp for a milling machine or the like comprises a substantially semi-cylindrical body having inner and outer surfaces with the same center in cross-section. The body has two circumferential ends terminating in two lips. It also has a circumferential slot extending a substantial distance circumferentially from a center of the body toward one lip. A washer has an inner surface matching in contour the outer cylindrical surface in the vicinity of the slot. In use the one lip is placed on the bed of the machine. The other lip is applied over the workpiece. A bolt is then passed from under the bed through the slot and washer, and fastened with a nut to clamp the body against the workpiece and the bed of the machine. Then, if properly placed, the milling tool may operate upon the workpiece.

1 Claim, 1 Drawing Sheet

CLAMP FOR MILLING MACHINES OR THE LIKE

BACKGROUND OF THE INVENTION

1. Field of the Invention

The invention relates to a clamp for a milling machine or the like.

2. Description of Related Art

Clamps for various purposes are well known. Applicant is aware of the following representative patents relating to clamps.

U.S. Pat. No. 48,431 to Peace June 27, 1865, for Gas Fitter's Clamp describes a clamp for holding pipe and permitting the pipe to be moved around to a convenient position.

U. S. Pat. No. 321,995 to Minea Jul. 14, 1886, for Vise. This patent describes jaws for a vise that may be removed to permit the vise to be used as an ordinary vise, or provided with cheek plates that may be adapted to the form of the work.

U.S. Pat. No. 688,722 to Eckard Dec. 10, 1901, for Pipe Vise. The vise has a fitting that may be used to engage pipe, and then a detent permits the fitting to be swung out of the way, so that the vise may be used in an ordinary manner.

U.S. Pat. No. 2,242,080 to Kuzina May 13, 1941, for Sprocket-Removing Fixture describes a tool for gripping and removing a sprocket wheel. This tool employs a pair of semi-cylindrical members that fit together in cylindrical form to grasp the wheel for removal.

U.S. Pat. No. 2,615,238 Oct. 28, 1952 for Tank Clamp Support Holder relates to clamping tubular holders in fixed position while being worked upon, and then readily releasing the holder.

U.S. Pat. No. 3,561,750 Feb. 9, 1971, to Woodrum for Hose Straightening Fixture describes a coupling member for fastening or clamping to straighten a curved hose.

U.S. Pat. No. 4,632,374 to Yang Dec. 30, 1986, describes an improved vise the respective jaws of that are provided with a sliding movable clamp piece for clamping a workpiece having a plain surface or an irregular surface. The sliding movable clamp piece can automatically adjust angular and eccentric sliding movement to position the workpiece between the jaws.

SUMMARY

According to the invention, a clamp cooperates with a milling machine having a work bed, a milling took, and a bolt extending through the bed. The clamp comprises a cylindrical body having inner and outer cylindrical surfaces having the same axis in cross-section. The body has a slot substantially on one circumferential side. A washer has one face matching in contour the outer cylindrical surface of the body. When the bolt is extended from below the bed of the milling machine through the slot and washer, and is fastened with washer matching the contour of the outer cylindrical surface of the body, a lip of the body may clamp down a workpiece by one circumferential lip, the other circumferential lip being clamped against the bed. The milling tool may then act upon the workpiece when correctly positioned.

BRIEF DESCRIPTION OF THE DRAWINGS

The various objects, advantages, and novel features of the invention will be more fully apparent from the following detailed description when read in connection with the accompanying drawing in which.

DESCRIPTION OF ILLUSTRATIVE EMBODIMENTS

Figure 1:
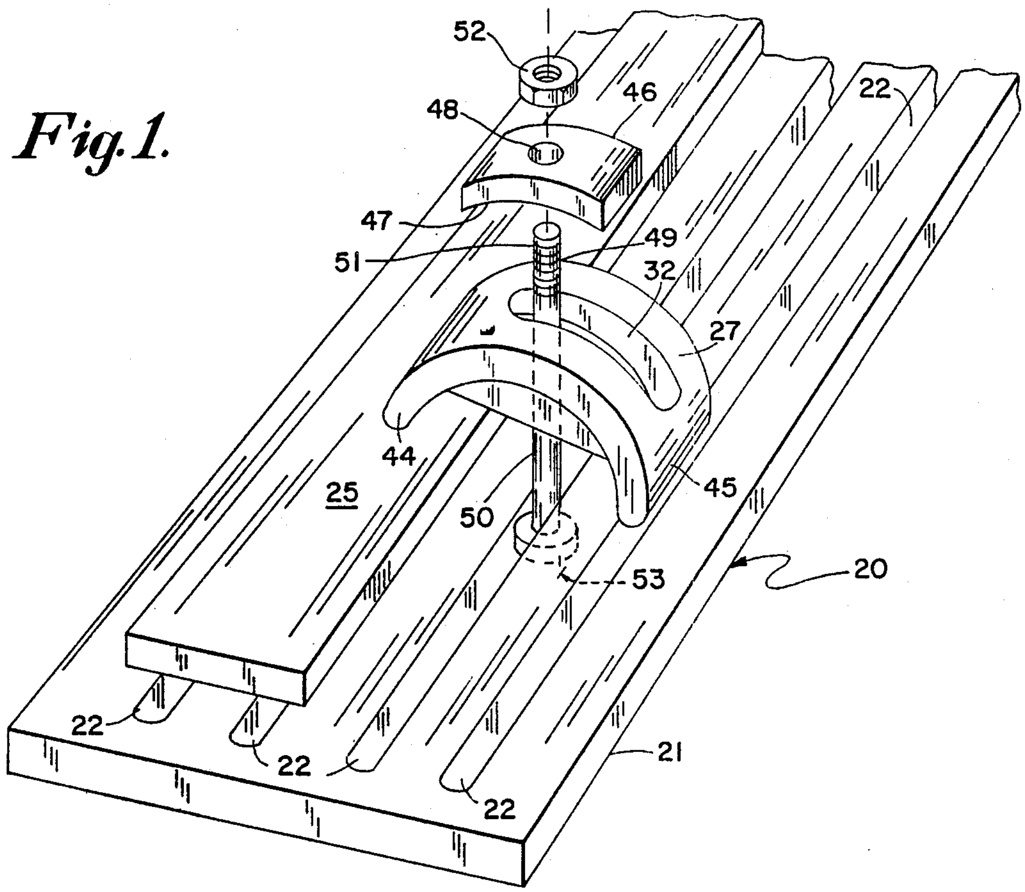
FIG. 1 is a perspective view of an embodiment of the invention.
Figure 2:
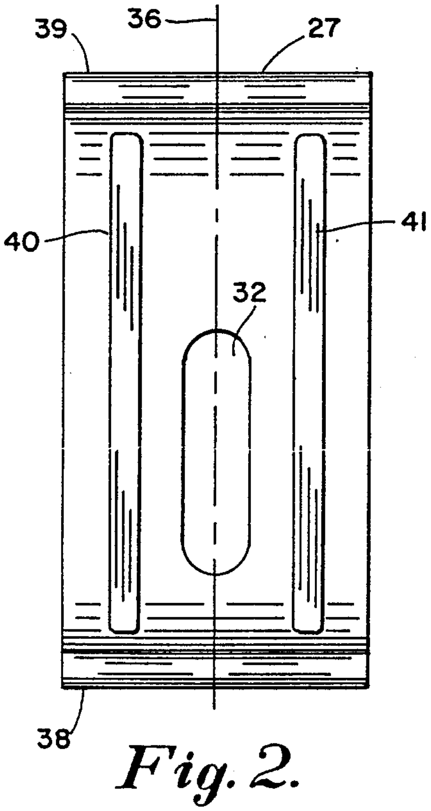
FIG. 2 is a bottom view of the body of the clamp of the invention.
Figure 3:
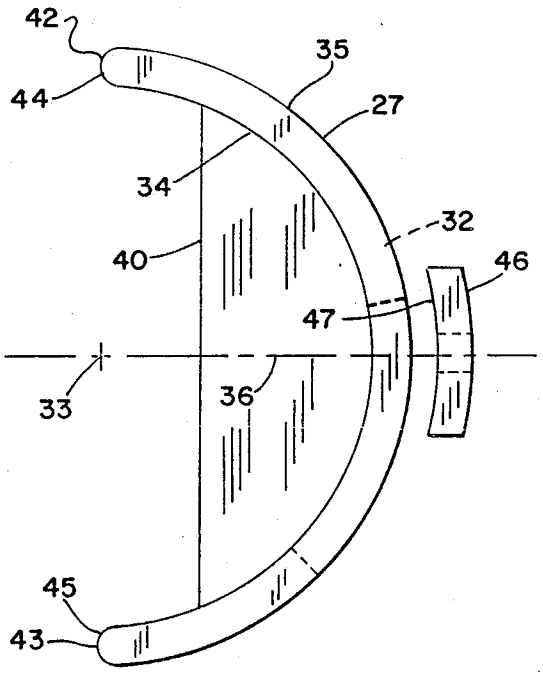
FIG. 3 is a side view of the body of FIG. 2 with the addition of a washer.

A milling machine 20 comprises a bed 21 having a plurality of slots 22 in the bed; a milling tool 20A may extend to work on a workpiece 25 on the bed 21.

A one-piece body 27, that may be of aluminum or steel, and is of cylindrical, almost semi-circular cross-section, has a circumferential slot 32. The body 27 has a common center 33 in cross-section (hence a line or longitudinal axis) for the inner, or concave, and outer or convex, surfaces 34 and 35 respectively. Each of the cylindrical surfaces 34, 35 each is bisected by a second, normal axis in a median plane 36 that includes the center point (or line 33). A pair of ribs 40, 41 extend symmetrically on each side of the medial plane 36 substantially from one circumferential end 42 to the other circumferential end 43. The circumferential ends 42, 43 of the body 27 are formed into lips 44, 45 respectively and each end of the body has axial ends 38 and 39 that are semi-circular and attached somewhat tangentially. The ribs 40 and 41 terminate at a chord that is transverse the second axis, the chord lying between the first longitudinal axis at 33 and a point midway between the first longitudinal axis 33 and the intersection of the second axis and said concave surface 34. The ribs 40 and 41 are parallel and transverse to the first longitudinal axis 33 and tend to withstand tensile stress resulting from the clamping action, as will be apparent from the following description. The body extends circumferentially about substantially 180°.

A washer 46 has an inner, or concave, surface 47 that matches in contour the outer, or convex, cylindrical surface 35 of the body, especially in the neighborhood of the slot 32. The slot 32 extends circumferentially from about the mid-line of the circumference a substantial distance toward one lip 45. Thus the slot 32 is positioned asymmetrically with respect to the second, or normal, axis in the median plane 36. The washer 46 covers the slot 32, and has an aperture 48 to receive the shank 49 of a bolt 50. One end 51 of the bolt 50 is threaded to receive an internally threaded nut 52. The head 53 at the other end of the bolt 50 is sufficiently large to resist passage through the plurality of slots 22 in the bed 21 of the milling machine.

When it is desired to use the clamp formed by the body 27, the workpiece 25 is suitably positioned. One lip 44 of the body is placed over the workpiece 25 and the other lip 45 of the body is placed against the bed 21. The bolt 50 is passed from under the bed 21 through one of the plurality of slots 22. The shank 49 is extended through the slot 32. The washer 46 is placed with the shank 49 of the body 50 received in the aperture with the semi-circular inner surface 47 of the washer 46 placed to match the contour of the outer cylindrical surface 35 of the body 27. The nut 52 is then fastened on the bolt 50 and tightened. In FIG. 1 the bolt 50, washer 56 and the nut 52 are shown slightly exploded to clarify the relation of these parts.

Clearly the workpiece 25 can be positioned in any location and is clamped firmly to be bed 21 so that milling tool 20A has access to any sized workpiece 25. The clamp is simple to operate and install and affords the flexibility that a single, simple clamp may clamp workpieces of various sizes and shapes. If the workpiece is so large as to exceed the circumferential bite of the clamp, a larger body may be used. With only a few bodies of the nature herein described, a large repertoire of workpieces is readily and easily machined.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A clamping assembly for clamping a workpiece to a work table, said clamping assembly comprising:

A. a one-piece clamping member having a substantially semi-cylindrical body that extends along a first, longitudinal axis between first and second axial ends and terminates circumferentially with lip portions for directly abutting the workpiece and work table thereby to exert normal clamping force components on the workpiece and the work table, said body having concentric concave and convex surfaces between said lip portions, a circumferential slot formed through said body at a longitudinally central position thereon and located asymmetrically with respect to a second axis that is normal to the longitudinal axis and that bisects said body and a pair of parallel planar reinforcing ribs extending between the concave surface of said body and a chord that is transverse the second axis, the cord lying between the first longitudinal axis and a point midway between the first longitudinal axis and the intersection of the second longitudinal axis and said concave surface, said ribs being parallel and transverse to the first longitudinal axis, each said rib being positioned intermediate said slot and one of said axial ends, B. a bolt having a head for capture by the work table and a threaded shank for extending from the worktable through said clamping member slot, C. a washer member having an aperture therethrough for receiving said threaded shank and having a concave surface that corresponds to the convex surface of said clamping member body, and D. a nut for being threaded onto said threaded shank to force said washer member against said clamping member to clamp the workpiece to the work table.

* * * * *